United States Patent
Krichtafovitch et al.

(10) Patent No.: US 9,739,479 B2
(45) Date of Patent: Aug. 22, 2017

(54) BATTERY-POWERED HIGH-VOLTAGE CONVERTER CIRCUIT WITH ELECTRICAL ISOLATION AND MECHANISM FOR CHARGING THE BATTERY

(71) Applicant: ClearSign Combustion Corporation, Seattle, WA (US)

(72) Inventors: Igor A. Krichtafovitch, Kirkland, WA (US); Joseph Colannino, Bellevue, WA (US); Christopher A. Wiklof, Everett, WA (US)

(73) Assignee: CLEARSIGN COMBUSTION CORPORATION, Seattle, WA (US)

( * ) Notice: Subject to any disclaimer, the term of this patent is extended or adjusted under 35 U.S.C. 154(b) by 214 days.

(21) Appl. No.: 14/775,887

(22) PCT Filed: Mar. 27, 2014

(86) PCT No.: PCT/US2014/031958
§ 371 (c)(1),
(2) Date: Sep. 14, 2015

(87) PCT Pub. No.: WO2014/160830
PCT Pub. Date: Oct. 2, 2014

(65) Prior Publication Data
US 2016/0033125 A1 Feb. 4, 2016

Related U.S. Application Data

(60) Provisional application No. 61/806,357, filed on Mar. 28, 2013.

(51) Int. Cl.
*F23Q 3/00* (2006.01)
*F23C 99/00* (2006.01)
(Continued)

(52) U.S. Cl.
CPC ............ *F23C 99/001* (2013.01); *F23N 5/265* (2013.01); *F23Q 3/00* (2013.01); *H02J 7/0052* (2013.01);
(Continued)

(58) Field of Classification Search
CPC ... F23Q 3/00; F23N 5/265; F23O 3/00; F23C 99/00
(Continued)

(56) References Cited

U.S. PATENT DOCUMENTS

| | | |
|---|---|---|
| 2,604,936 A | 7/1952 | Kaehni et al. |
| 3,167,109 A | 1/1965 | Wobig |

(Continued)

FOREIGN PATENT DOCUMENTS

| | | |
|---|---|---|
| EP | 0844434 | 5/1998 |
| FR | 2577304 | 12/1989 |

(Continued)

OTHER PUBLICATIONS

PCT International Search Report and Written Opinion of International PCT Application No. PCT/US2014/031958 mailed Aug. 13, 2014.

*Primary Examiner* — Gregory Huson
*Assistant Examiner* — Nikhil Mashruwala
(74) *Attorney, Agent, or Firm* — Christopher A. Wiklof; Nicholas S. Bromer; Launchpad IP, Inc.

(57) ABSTRACT

A burner system includes a fuel nozzle, an electrode configured to apply electrical energy to a combustion reaction supported by the fuel nozzle, a high-voltage converter configured to receive electrical energy from a low-voltage power supply and to provide high-voltage power to the electrode, a battery charger, and a switch module coupled to the battery charger, the converter, and first and second batteries. The switch module is selectively switchable (Continued)

between first and second conditions. In the first condition, the first battery is coupled to the battery charger and decoupled from the high-voltage converter, while the second battery is coupled to the high-voltage converter and decoupled from the battery charger. In the second condition, the first battery is coupled to the high-voltage converter and decoupled from the battery charger, while the second battery is coupled to the battery charger and decoupled from the converter.

14 Claims, 2 Drawing Sheets

(51) Int. Cl.
   *F23N 5/26* (2006.01)
   *H02J 7/00* (2006.01)
(52) U.S. Cl.
   CPC ...... *F23D 2207/00* (2013.01); *F23N 2023/30* (2013.01); *F23N 2027/36* (2013.01); *F23N 2031/12* (2013.01)
(58) Field of Classification Search
   USPC ...................................... 431/2, 8, 12, 18, 31
   See application file for complete search history.

(56) References Cited

U.S. PATENT DOCUMENTS

| | | | |
|---|---|---|---|
| 3,306,338 A | 2/1967 | Wright et al. | |
| 3,416,870 A | 12/1968 | Wright | |
| 4,111,636 A | 9/1978 | Goldberg | |
| 4,257,579 A * | 3/1981 | Bruhn | C21B 11/02 165/104.13 |
| 5,567,144 A | 10/1996 | McCoy | |
| 5,599,181 A * | 2/1997 | Aoki | F23N 5/102 126/39 BA |
| 5,702,244 A | 12/1997 | Goodson et al. | |
| 5,721,391 A | 2/1998 | Thorsted et al. | |
| 5,784,889 A | 7/1998 | Joos et al. | |
| 7,137,808 B2 | 11/2006 | Branston et al. | |
| 7,159,646 B2 | 1/2007 | Dessiatoun et al. | |
| 7,243,496 B2 | 7/2007 | Pavlik et al. | |
| 7,523,603 B2 | 4/2009 | Hagen et al. | |
| 7,845,937 B2 | 12/2010 | Hammer et al. | |
| 7,944,678 B2 * | 5/2011 | Kaplan | F23Q 3/004 361/253 |
| 8,851,882 B2 | 10/2014 | Hartwick et al. | |
| 8,881,535 B2 | 11/2014 | Hartwick et al. | |
| 8,911,699 B2 | 12/2014 | Colannino et al. | |
| 9,209,654 B2 | 12/2015 | Colannino et al. | |
| 9,243,800 B2 | 1/2016 | Goodson et al. | |
| 9,267,680 B2 | 2/2016 | Goodson et al. | |
| 9,284,886 B2 | 3/2016 | Breidenthal et al. | |
| 9,289,780 B2 | 3/2016 | Goodson | |
| 9,310,077 B2 | 4/2016 | Breidenthal et al. | |
| 9,366,427 B2 | 6/2016 | Sonnichsen et al. | |
| 9,371,994 B2 | 6/2016 | Goodson et al. | |
| 9,377,188 B2 | 6/2016 | Ruiz et al. | |
| 9,377,189 B2 | 6/2016 | Ruiz et al. | |
| 9,377,195 B2 | 6/2016 | Goodson et al. | |
| 9,441,834 B2 | 9/2016 | Colannino et al. | |
| 9,453,640 B2 | 9/2016 | Krichtafovitch et al. | |
| 9,469,819 B2 | 10/2016 | Wiklof | |
| 9,494,317 B2 | 11/2016 | Krichtafovitch et al. | |
| 9,496,688 B2 | 11/2016 | Krichtafovitch et al. | |
| 9,513,006 B2 | 12/2016 | Krichtafovitch et al. | |
| 2002/0004186 A1 | 1/2002 | Lochschmied | |
| 2005/0208442 A1 | 9/2005 | Heiligers et al. | |
| 2007/0020567 A1 | 1/2007 | Branston et al. | |
| 2010/0183424 A1 | 7/2010 | Roy | |
| 2011/0203771 A1 | 8/2011 | Goodson et al. | |
| 2013/0004902 A1 | 1/2013 | Goodson et al. | |
| 2013/0071794 A1 | 3/2013 | Colannino et al. | |
| 2013/0230810 A1 | 9/2013 | Goodson et al. | |
| 2013/0260321 A1 | 10/2013 | Colannino et al. | |
| 2013/0323661 A1 | 12/2013 | Goodson et al. | |
| 2013/0333279 A1 | 12/2013 | Osler et al. | |
| 2013/0336352 A1 | 12/2013 | Colannino et al. | |
| 2014/0051030 A1 | 2/2014 | Colannino et al. | |
| 2014/0065558 A1 | 3/2014 | Colannino et al. | |
| 2014/0076212 A1 | 3/2014 | Goodson et al. | |
| 2014/0080070 A1 | 3/2014 | Krichtafovitch et al. | |
| 2014/0162195 A1 | 6/2014 | Lee et al. | |
| 2014/0162197 A1 | 6/2014 | Krichtafovitch et al. | |
| 2014/0162198 A1 | 6/2014 | Krichtafovitch et al. | |
| 2014/0170569 A1 | 6/2014 | Anderson et al. | |
| 2014/0170571 A1 | 6/2014 | Casasanta, III et al. | |
| 2014/0170575 A1 | 6/2014 | Krichtafovitch | |
| 2014/0170576 A1 | 6/2014 | Colannino et al. | |
| 2014/0170577 A1 | 6/2014 | Colannino et al. | |
| 2014/0196368 A1 | 7/2014 | Wiklof | |
| 2014/0208758 A1 | 7/2014 | Breidenthal et al. | |
| 2014/0212820 A1 | 7/2014 | Colannino et al. | |
| 2014/0216401 A1 | 8/2014 | Colannino et al. | |
| 2014/0227645 A1 | 8/2014 | Krichtafovitch et al. | |
| 2014/0227646 A1 | 8/2014 | Krichtafovitch et al. | |
| 2014/0227649 A1 | 8/2014 | Krichtafovitch et al. | |
| 2014/0248566 A1 | 9/2014 | Krichtafovitch et al. | |
| 2014/0255855 A1 | 9/2014 | Krichtafovitch | |
| 2014/0255856 A1 | 9/2014 | Colannino et al. | |
| 2014/0272731 A1 | 9/2014 | Breidenthal et al. | |
| 2014/0287368 A1 | 9/2014 | Krichtafovitch et al. | |
| 2014/0295094 A1 | 10/2014 | Casasanta, III | |
| 2015/0079524 A1 | 3/2015 | Colannino et al. | |
| 2015/0107260 A1 | 4/2015 | Colannino et al. | |
| 2015/0118629 A1 | 4/2015 | Colannino et al. | |
| 2015/0121890 A1 | 5/2015 | Colannino et al. | |
| 2015/0140498 A1 | 5/2015 | Colannino | |
| 2015/0147704 A1 | 5/2015 | Krichtafovitch et al. | |
| 2015/0147705 A1 | 5/2015 | Colannino et al. | |
| 2015/0219333 A1 | 8/2015 | Colannino et al. | |
| 2015/0276211 A1 | 10/2015 | Colannino et al. | |
| 2015/0338089 A1 | 11/2015 | Krichtafovitch et al. | |
| 2015/0345780 A1 | 12/2015 | Krichtafovitch | |
| 2015/0345781 A1 | 12/2015 | Krichtafovitch et al. | |
| 2015/0362178 A1 | 12/2015 | Karkow et al. | |
| 2016/0018103 A1 | 1/2016 | Karkow et al. | |
| 2016/0040872 A1 | 2/2016 | Colannino et al. | |
| 2016/0161115 A1 | 6/2016 | Krichtafovitch et al. | |

FOREIGN PATENT DOCUMENTS

| | | |
|---|---|---|
| GB | 932955 | 7/1963 |
| JP | 58-019609 | 2/1983 |
| WO | WO 96/01394 | 1/1996 |

* cited by examiner

BATTERY-POWERED HIGH-VOLTAGE CONVERTER CIRCUIT WITH ELECTRICAL ISOLATION AND MECHANISM FOR CHARGING THE BATTERY

CROSS REFERENCE TO RELATED APPLICATIONS

The present application is a U.S. National Phase application under 35 U.S.C. 371 of co-pending International Patent Application No. PCT/US2014/031958, entitled "BATTERY-POWERED HIGH-VOLTAGE CONVERTER CIRCUIT WITH ELECTRICAL ISOLATION AND MECHANISM FOR CHARGING THE BATTERY," filed Mar. 27, 2014; which application claims the benefit of U.S. Provisional Patent Application No. 61/806,357, entitled "BATTERY-POWERED HIGH-VOLTAGE CONVERTER CIRCUIT WITH ELECTRICAL ISOLATION AND MECHANISM FOR CHARGING THE BATTERY," filed Mar. 28, 2013; each of which, to the extent not inconsistent with the disclosure herein, is incorporated herein by reference.

BACKGROUND

Technical Field

This disclosure is related to structures and methods for producing a high-voltage charge while electrically isolating high-voltage circuitry from other elements of the system; in particular, the disclosure is related to burner systems that include structures for applying a high-voltage charge to combustion reactions, while also providing a safeguard against accidental high-voltage shocks.

Description of the Related Art

Combustion processes are employed in many commercial and industrial systems for a wide range of purposes, such as, e.g., for environmental heating, power generation, smelting, refining, propulsion, etc. In many such systems, the combustion process can be modified by applying an electrical potential to the combustion reaction, in order, for example, to improve efficiency, reduce harmful emissions, localize heat production, etc. Typically, such a charge potential is applied via an electrode that carries a high voltage at very low current. Thus, although the voltage is very high, sometimes, for example, exceeding 40 or 50 kV, the power expended by such systems is very low.

High-voltage power is typically obtained employing a transformer, a voltage multiplier, or other type of converter to convert power from a relatively low-voltage source to the necessary high voltage.

SUMMARY

According to an embodiment, a burner system includes a fuel nozzle, an electrode positioned and configured to apply an electrical charge to a combustion reaction supported by the fuel nozzle, a high-voltage converter configured to receive electrical energy from a low-voltage power supply and to provide high-voltage power to the electrode, a battery charger, and a switch module coupled to the battery charger, the high-voltage converter, and first and second batteries. The switch module is selectively switchable between first and second conditions. In the first condition, the first battery is coupled to the battery charger and decoupled from the high-voltage converter, while the second battery is coupled to the high-voltage converter and decoupled from the battery charger. In the second condition, the first battery is coupled to the high-voltage converter and decoupled from the battery charger, while the second battery is coupled to the battery charger and decoupled from the high-voltage converter.

According to another embodiment, a method is provided, in which a high-voltage converter is powered by a first battery to provide a high-voltage charge to a combustion reaction, while a second battery is coupled to a battery charger. When a state-of-charge (SOC) of the first battery drops to a first threshold, the first battery is decoupled from the high-voltage converter, then coupled to the battery charger, while the second battery is decoupled from the battery charger, then coupled to the high-voltage converter. The high-voltage converter is thereafter powered by the second battery until the SOC of the second battery drops to the first threshold. When the SOC of the second battery drops to the first threshold, the second battery is decoupled from the high-voltage converter, then coupled to the battery charger, while the first battery is decoupled from the battery charger, then coupled to the high-voltage converter.

DETAILED DESCRIPTION

Figure 1:
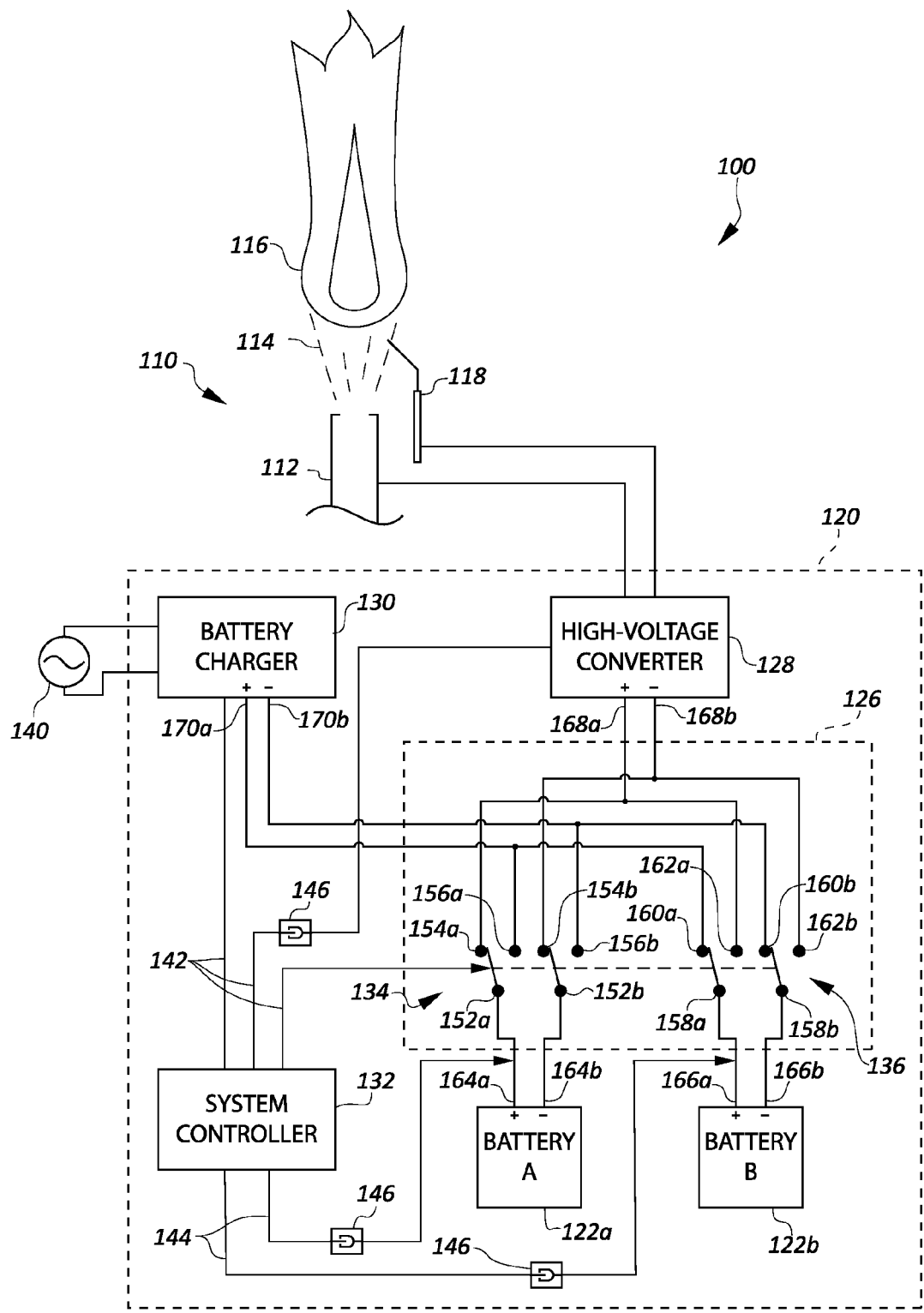
FIG. 1 is a diagrammatic view of a burner system and associated power supply module, according to an embodiment.

In the following detailed description, reference is made to the accompanying drawings, which form a part hereof. In the drawings, which are not to scale or to proportion, similar symbols typically identify similar components, unless context dictates otherwise. The illustrative embodiments described in the detailed description, drawings and claims, are not meant to be limiting. Other embodiments may be used and/or and other changes may be made without departing from the spirit or scope of the present disclosure.

One concern that the inventors have identified, with respect to the electrical charge that is applied to a combustion process, is related to the extremely high voltage present. While the actual danger of serious injury is not extreme, because of the very low current involved, there is a widely perceived danger of injury anytime a high-voltage potential is present, and there is a potential for a very painful shock. Thus, it is desirable to take steps to ensure that, in case of a malfunction or fault in the electrical circuitry, a high-voltage charge cannot be applied to portions of the system that are normally operated at relatively low voltages, or that are electrically neutral.

The inventors have recognized that the power demand of the high-voltage supply is extremely low, in spite of the high voltage, and could be met by a battery. Furthermore, by using a battery to power at least the high-voltage portion of the system, the high-voltage portion can be completely electrically isolated from other parts of the system, thereby reducing the likelihood of accidental electric shocks to a very low level. Accordingly, various embodiments are disclosed in which one or more batteries are used to power a high-voltage electrical system, which are removed from contact with the high-voltage system before being connected to a recharging system. Structures and methods are disclosed for reliably powering the high-voltage portion of the system while isolating the high-voltage portion from other portions. Principles of the invention, aspects of which are defined in the appended claims, are illustrated in the exemplary embodiments described hereafter.

FIG. 1 is a diagrammatic representation of a burner system 100 according to an embodiment. The burner system 100 includes a burner assembly 110 and a power supply 120. The burner assembly 110 includes a fuel nozzle 112 configured to emit a fuel jet 114 and to support a combustion reaction 116. A charge electrode 118 is positioned and configured to apply a charge potential to the combustion reaction 116.

The power supply 120 includes a battery A 122a and a battery B 122b, a switch module 126, a high-voltage converter module 128, a battery charger module 130, and a control module 132. The battery charger 130 includes an input terminal configured to be coupled to a power source 140, such as, e.g., a standard municipal AC connection, a generator output, etc. The battery charger 130 also includes an output terminal 170 that comprises positive and negative output terminals 170a, 170b configured to be connected to respective terminals of a battery for charging.

The high-voltage converter 128 includes an input terminal 168 having positive and negative input terminals 168a, 168b configured to receive a low-voltage DC input power supply, and an output terminal coupled to the charge electrode 118 of the burner assembly 110. The high-voltage converter 128 is configured to convert power drawn from the low-voltage DC input power supply to a high-voltage output signal, to be applied to the combustion reaction 116.

The high-voltage signal can be any appropriate type of signal, including, e.g., AC, DC, and AC with a DC offset. A number of methods and structures are known for converting low voltage to high voltage, including, e.g., a voltage multiplier. Any appropriate structure and method can be used.

According to an embodiment, the high-voltage converter 128 is configured to produce a voltage, at the output terminal, exceeding 10 kV. According to another embodiment, the high-voltage converter is configured to produce a voltage exceeding 40 kV. According to a further embodiment, the high-voltage converter 128 is configured to produce a time-varying signal having a peak-to-peak voltage exceeding 40 kV.

The output terminal of the high-voltage converter 128 is shown as having a first conductor coupled to the charge electrode 118, and a second conductor coupled to the fuel nozzle 112. This arrangement is shown as an example, but is only one of many different configurations that are or can be used. Generally speaking, when an energy potential is applied to a combustion reaction 116, two structures near the combustion reaction 116 are coupled to the high-voltage source, between which is present a high-voltage potential. In some cases, an electrical circuit is formed, that includes the combustion reaction 116, so that a current flows through the reaction. In other cases, a charge is built up in the reaction, in the form of a static charge or charged ions, etc. A number of different structures can be coupled to the high-voltage converter 128 to apply various types of charges, and to produce various effects. Such structures include the nozzle 112, flame holders, corona electrodes, field electrodes, a housing surrounding the combustion reaction 116, an ionizer, etc. For the purposes of the claims, the term electrode is to be construed broadly as reading on any structure or combination of structures employed to apply electrical energy to or maintain electrical continuity with a combustion reaction 116.

According to one embodiment, the switch module 126 includes a 4PDT switch or, as shown in FIG. 1, first and second DPDT switches, 134, 136, that are arranged to cooperate, as discussed in more detail below. The first switch 134 includes a pair of common nodes 152a, 152b, each of which, in turn, is switchable between a respective first position switch node 154a, 154b and a second position switch node 156a, 156b. Similarly, the second switch 136 includes a pair of common nodes 158a, 158b, each of which, in turn, is switchable between a respective first position switch node 160a, 160b and a second position switch node 162a, 162b. The switch module 126 is switchable between a first condition, as shown in FIG. 1, in which the common nodes 152a, 152b, 158a, 158b of each of the first and second switches 134, 136 are coupled to their respective first position switch nodes 154a, 154b, 160a, 160b, and a second condition, in which the common nodes of each of the first and second switches are coupled to their respective second position switch nodes 156a, 156b, 162a, 162b.

Positive and negative terminals 164a, 164b of the battery A 122a are coupled to respective common nodes 152a, 152b of the first switch 134, while positive and negative terminals 166a, 166b of the battery B 122b are coupled to respective common nodes 158a, 158b of the second switch 136. The positive input terminal 168a of the high-voltage converter module 128 is coupled to the first position switch node 154a of the first switch 134 and to the second position switch node 162a of the second switch 136, while the negative terminal 168b of the high-voltage converter module 128 is coupled to the other first position switch node 154b of the first switch 134 and to the other second position switch node 162b of the second switch 136.

The positive output terminal 170a of the battery charger 130 is coupled to the second position switch node 156a of the first switch 134 and to the first position switch node 160a of the second switch 136, while the negative output terminal 170b of the battery charger is coupled to the other second position switch node 156b of the first switch 134 and to the other first position switch node 160b of the second switch 136.

In the first condition of the switch module 126, the positive and negative terminals 164a, 164b of the battery A 122a are coupled, respectively, to the positive and negative input terminals 168a, 168b of the high-voltage converter 128 by the first switch 134. Meanwhile, the positive and negative terminals 166a, 166b of the battery B 122b are coupled, respectively, to the positive and negative output terminals 170a, 170b of the battery charger 130 by the second switch 134.

In the second condition of the switch module 126, the positive and negative terminals 164a, 164b of battery A 122a are coupled, respectively, to the positive and negative output terminals 170a, 170b of the battery charger 130 by the first switch 134, while the positive and negative terminals 166a, 166b of the battery B 122b are coupled, respectively, to the positive and negative input terminals 168a, 168b of the high-voltage converter 128 by the second switch 134.

The control module 132 is coupled, via control lines 142, to the battery charger 130, the high-voltage converter 128, and the switch module 126, in order to control operation of charger, the switch module, and the converter. Sensor signal lines 144 couple the control module 132 to the terminals 164a, 164b, 166a, 166b of the batteries A 122a, and B 122b, by which the control module monitors the state-of-charge (SOC) of each of the batteries A 122a, and B 122b. Isolators 146 are positioned in the control line 142 between the control module 132 and the high-voltage converter 128. Isolators 146 are also positioned in the sensor signal lines 144 between the control module 132 and the batteries A 122*a*, and B 122*b*. The isolators 146 serve to electrically isolate the high-voltage converter 128 from the control module 132 while permitting signals to pass along the lines 142, 144.

Where used in the present disclosure, state-of-charge (SOC) refers to the remaining usable potential energy in a battery.

According to an embodiment, the isolators 146 are optocouplers. One type of optocoupler includes an input terminal coupled to a light-emitting element, such as a diode, that is configured to produce light at a level that is directly related to a voltage supplied at the input. The optocoupler also includes an output terminal coupled to a light-sensitive resistor positioned adjacent to the light emitting element, and whose resistance varies in direct relation to the level of light produced by the light emitting element. A fixed current source is coupled to the resistor so that, as resistance changes, voltage across the resistor changes in direct relation. Thus as a voltage level at the input of the optocoupler changes, the voltage across the output resistor changes in direct relation, providing a corresponding voltage signal that is electrically isolated from the input signal. Other types of optocouplers are well known, as are other isolation devices, including, e.g., inductive couplers. Any appropriate isolator can be used in the circuit of FIG. 1.

While the system controller 132 is shown with sensor lines 144 coupled at the terminals 164*a*, 164*b*, 166*a*, 166*b* of the respective batteries A 122*a*, and B 122*b* in order to monitor the SOC of each battery, according to another embodiment, the sensor lines 144 are coupled at the output terminals 170 of the battery charger 130, to monitor the SOC of the battery that is connected to the charger, and at the input terminal 168 of the high-voltage converter 128, to monitor the SOC of the battery that is connected to the converter. In such an arrangement, one of the isolators 146 can be omitted, i.e., a sensor line 144 can be coupled directly between the control module 132 and the output terminal 170 of the battery charger 130, because there is no high-voltage at the battery charger.

According to another embodiment, the system controller 132 monitors the SOC of the batteries 122*a*, 122*b* by running a timer to determine the amount of time that the battery connected to the charger 130 has received charging and/or the amount of time that the battery connected to the high voltage converter 128 has been powering the system; and causes switching after an appropriate amount of time has elapsed. In this embodiment, sensor signal lines 144 and corresponding isolators 146 may be omitted. In this embodiment, routine measurement of battery capacity should be performed to verify that the selected charge and discharge times are compatible with the selected charge and discharge times.

According to an embodiment, the first and second switches 134, 136 of the switch module 126 are ganged together, as shown in FIG. 1. When the switch module 126 switches from one condition to the other, one of the batteries A 122*a*, and B 122*b* is disconnected from the high-voltage converter 128 and then connected to the battery charger 130, while simultaneously, the other of the batteries is disconnected from the battery charger 130 and then connected to the high-voltage converter 128. It will be recognized that during the switching, each of the switches 134, 136 breaks the connection on one side before making the connection on the other side. Thus, each of the batteries is disconnected from one switch node before being connected to the other switch node, so that there is no time during operation of the system when a direct connection could be made from the high-voltage converter 128 to the battery charger 130 or control module 132. The burner system 100 therefore provides significant protection from a high-voltage shock caused by a malfunction in the high-voltage converter.

According to an embodiment, both batteries of the burner system 100 are disconnected from the high-voltage converter 128 for a very brief moment in each change of condition of the switch module 126, during which the high-voltage converter is without a power source. A capacitor can be provided as part of the high-voltage converter 128, and that is charged during normal operation of the system. While the switch module 126 is switching, power is drawn from the capacitor for the brief moment that both batteries are disconnected. Alternatively, the switch module 126 can be configured to provide a slight delay between switching the two switches 134, 136, so that the freshly charged one of the batteries is connected to the high-voltage converter 128 before the other of the batteries is disconnected. For that brief instant, the two batteries are connected in parallel to the converter 128, so that the power applied to the input terminal 168 of the converter remains substantially continuous. Such an overlap in connection of the batteries does not change the complete isolation provided by the circuit, because neither batter is simultaneously connected to both the charger 130 and the converter 128. However, the overlap does ensure that the high-voltage converter 128 has an uninterrupted supply of power.

According to various embodiments, each of the batteries A 122*a*, and B 122*b* can be an individual battery package or a number of batteries coupled together in series and/or parallel to produce a desired voltage level, current capacity, and endurance. They can be of a type that is commonly available commercially, or can be built to meet the particular requirements of a specific application. The switch module 126 can be provided with battery connectors of a type that are commonly found in appliances or electronic devices, so that the batteries are easily replaceable. Alternatively, the battery connector can be specifically designed and produced for the particular battery configuration, or even nothing more than conductive wires coupled to respective terminals of the battery. Unless further defined, reference in the claims to a battery connector is to be construed broadly as reading on any structure configured to establish a connection with a battery terminal.

While the structure of the switch module 126 is described above in some detail, those of skill in the art will recognize that many different switching configurations and structures can be used to perform substantially the same function. Accordingly, any structure capable of selectably and independently connecting each of a plurality of batteries between a battery charger and a high-voltage converter, without connecting any of the batteries to the charger and the converter simultaneously, falls within the scope of the disclosure.

A method of operation of a burner system similar to the burner system 100 of FIG. 1 is described below with reference to the flow chart 200 of FIG. 2, according to an embodiment. In particular, the method is for provision of reliable low-voltage power to a high-voltage converter, while electrically isolating the high-voltage converter from other system components, such as a system controller, a battery charger, and a power source. The method is described with reference to a switch module configured like the switch module 126 of FIG. 1, but the principles disclosed can be applied to any switching system capable of performing similar functions. Furthermore, while, in a preferred embodiment, the method is ultimately for the provision of a high-voltage potential to a combustion reaction of a combustion system, the principles disclosed can be applied in other systems that employ a high-voltage converter, particularly systems in which the high-voltage converter does not deliver large amounts of power, so that it is practical to power the converter with a battery.

Figure 2:
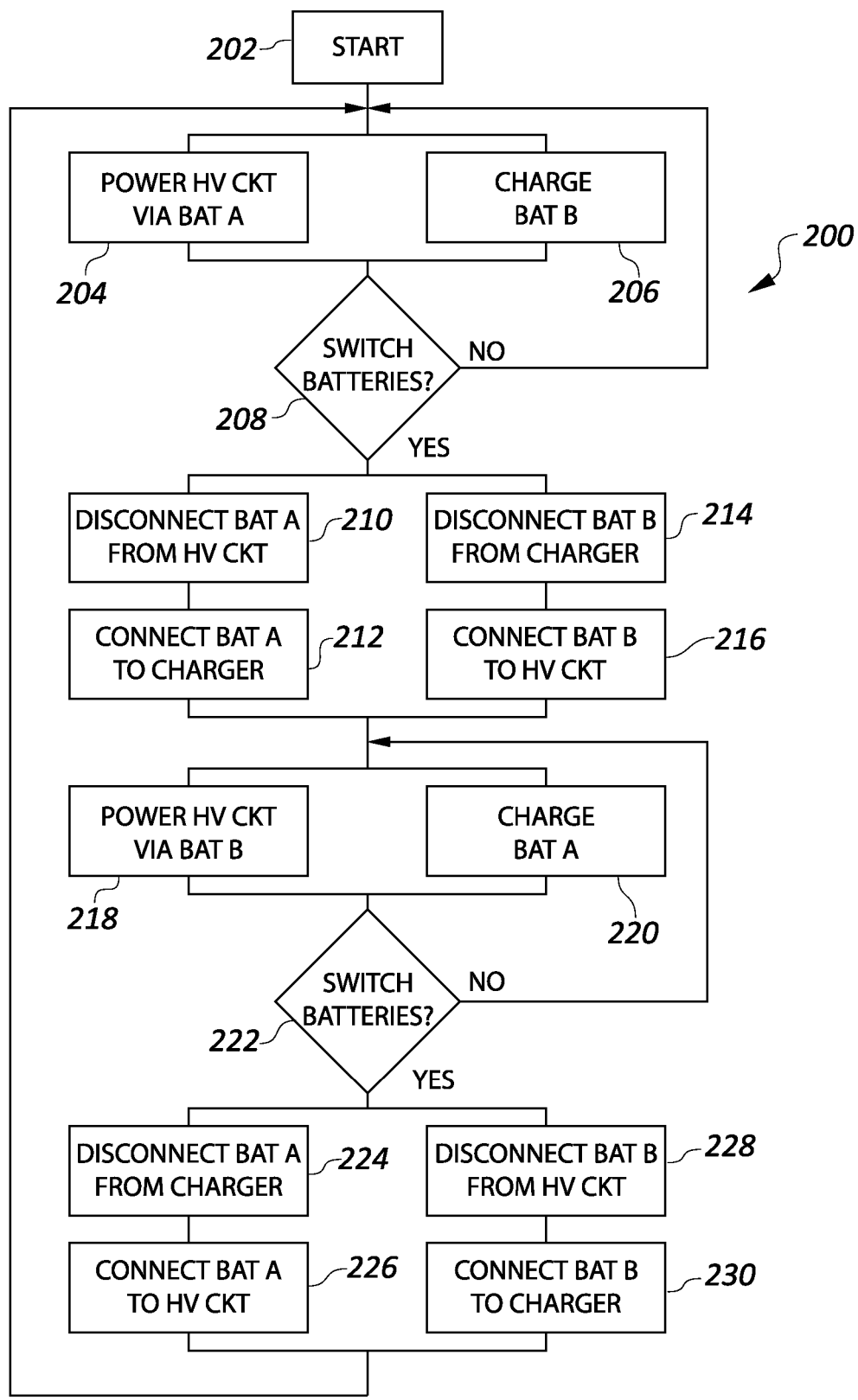
FIG. 2 is a flow chart showing steps of a method of operation of a burner system such as the system of FIG. 1, according to another embodiment.

As shown in FIG. 2, at the start of the process (202), the switch module is in a first condition, in which a battery A is the discharging battery, i.e., the high-voltage converter is powered by battery A (204), while a battery B is the charging battery, i.e., battery B is coupled to the battery charger for charging (206). The control module monitors the amount of stored energy remaining in batteries A and B, and the system continues in this configuration (208, NO path) until a switchover of the switch module from the first condition to a second condition is performed (208, YES path).

The decision to switch over the batteries can be based on the state-of-charge (SOC) of the discharging battery, such as when the SOC of battery A drops to a value at or below a first selected threshold value. Alternatively, the switchover decision can be based on the SOC of the charging battery, such as when the SOC of battery B rises to a value at or above a second selected threshold. In either case, it is preferable that switchover occur while the SOC of the discharging battery is still at or above a third threshold value, the third threshold value being a minimum selected value for powering the high-voltage converter. The specific parameters that are considered in the determination to perform switchover are a design choice, based on factors such as the power requirements of the particular system, the type of batteries used, the age of the batteries, etc. Some of these factors are discussed in more detail below with reference to various embodiments.

During performance of the switchover procedure, the control module controls the switch module to switch to the opposite position—in this case, the second condition. Switching from the first to the second condition entails moving the first switch from its first position to its second position in order to disconnect battery A from the input terminal of the high-voltage converter (210), and connecting battery A to the output terminal of the battery charger (212). Simultaneously, the second switch is moved from its first position to its second position in order to disconnect battery B from the output terminal of the battery charger (214) and connect battery B to the input terminal of the high-voltage converter (216). Thereafter, battery B is the discharging battery and battery A is the charging battery, i.e., the high-voltage converter is powered by battery B (218) while the battery charger is coupled to battery A for charging (220). The control module continues to monitor the amount of stored energy remaining in batteries A and B, and the system continues in this configuration (222, NO path), with the switch module in its second condition until switchover of the switch module from the second condition back to the first condition is performed (222, YES path).

During the switchover following step 222, the control module controls the switch module to switch to the first condition, from the second condition. Switching from the second to the first condition entails moving the first switch from its second position to its first position in order to disconnect battery A from the output terminal of the battery charger (224) and connect battery A to the input terminal of the high-voltage converter (226). Simultaneously, the second switch is moved from its second position to its first position in order to disconnect battery B from the input terminal of the high-voltage converter (228) and connect battery B to the output terminal of the battery charger (230). Thereafter, battery A is again the discharging battery and battery B is again the charging battery. The process then returns to the beginning and repeats.

According to an embodiment, during switchover the control module is configured to move the first and second switches in sequence, rather than simultaneously, as previously described, such that, during the switching procedure, both batteries A and B are momentarily coupled to the input terminal of the high-voltage converter. Thus, given the configuration described above, when switching from the first condition to the second condition (in the YES path immediately following performance of step 208), the control module controls the second switch to move from its first position to its second position (steps 214 and 216), after which the first switch is controlled to switch from its first position to its second position (steps 210 and 212). Conversely, when switching the switch module from the second condition to the first condition (in the YES path immediately following performance of step 222), the control module controls the first switch to move from its second position to its first position (steps 224 and 226), after which the second switch is controlled to switch from its second position to its first position (steps 228 and 230). This embodiment of the method provides the high-voltage converter with a continuous supply of power during switchover.

In an embodiment described above with reference to FIG. 2, the batteries are switched over when the discharging battery discharges to the first threshold value, at steps 208 and 222. Such an arrangement may result in the batteries being switched at a substantially identical voltage level each time. As is known in the art, some rechargeable batteries, e.g., nickel-cadmium-type batteries, are subject to a "memory effect" when operated under such conditions, in which a battery's output suddenly drops when it reaches the precise SOC at which it is normally recharged. When using such batteries, the point at which a battery is recharged should preferably be more randomly selected. Other types of batteries, e.g., nickel-metal hydride batteries, do not experience the memory effect. Some, but not all types of rechargeable batteries can be damaged by overcharging, while some, but not all types of batteries can be damaged by fully discharging. Other types of batteries benefit from being fully discharged periodically. Most types of rechargeable batteries discharge more quickly as they age, so that less power can be drawn from a battery between when it is fully charged and fully discharged. Various alternative embodiments are provided to accommodate the particular type of battery selected for use in a particular application.

According to one embodiment, the control module causes the switch module to switch over at a more or less randomly-selected moment after the SOC of the discharging battery has dropped past the first selected threshold, but no later than when the SOC of the discharging battery reaches the (lower) third selected threshold.

According to another embodiment, the control module causes the switch module to switch over after the SOC of the discharging battery has dropped past the first selected threshold and at a value that is different from the value at which that battery was switched the most recent previous time.

According to an embodiment, the control module causes the switch module to switch over when the SOC of the battery that is connected to the battery charger (the charging battery) reaches the second selected threshold, even though the discharging battery may be only partially discharged.

According to an embodiment, the control module causes the battery charger to stop or reduce the charging current when the SOC of the charging battery reaches a charging threshold.

According to an embodiment, the switchover decision is based on an amount of time that the battery connected to the charger has received charging and/or the amount of time that the battery connected to the high voltage converter has been powering the system.

According to an embodiment, the control module tracks the time it takes for the SOC of each battery to reach a discharge threshold from a fully charged condition, and produces an alert signal when the discharge time of either battery drops below a time threshold, indicating that one or both batteries should be replaced.

According to an embodiment, the control module tracks the elapsed time from the moment the SOC of the charging battery reaches a charging threshold to the moment the SOC of the discharging battery reaches a discharging threshold, and produces an alert signal when the elapsed time drops below a time threshold, indicating that one or both batteries should be replaced.

According to an embodiment, the control module produces an alert signal indicating that one or both batteries should be replaced if the SOC of the discharging battery drops to a discharging threshold before the SOC of the charging battery reaches a charging threshold.

The unit symbol "kV" is used herein to refer to a value in kilovolts. One kilovolt is equal to 1,000 volts.

Ordinal numbers, e.g., first, second, third, etc., are used in the claims according to conventional claim practice, i.e., for the purpose of clearly distinguishing between claimed elements or features thereof. The use of such numbers does not suggest any other relationship, e.g., order of operation or relative position of such elements. Furthermore, ordinal numbers used in the claims have no specific correspondence to those used in the specification to refer to elements of disclosed embodiments on which those claims read, nor to numbers used in unrelated claims to designate similar elements or features.

In some of the processes described in the present disclosure, some parameter of the system is measured, monitored, or detected. As used in the specification and claims, such terms are not limited to actually obtaining a value for comparison or calculation. For example, the process described with reference to FIG. 2 includes monitoring a state-of-charge of the batteries A, and B. While some systems may be configured to provide a true value of the remaining amp-hours of available stored energy, there are many alternative solutions that are acceptable. In many types of batteries, the output voltage changes in direct relation to the SOC. Thus, by monitoring the output voltage, the SOC can be inferred. However, even determining an actual voltage may be more than is necessary. Instead, a reference voltage may be provided, which corresponds to a battery output voltage at a charging or discharging threshold value of the SOC. A circuit can be provided that compares the instantaneous output voltage of the battery with the reference voltage, and produces a particular signal when the output voltage drops below or rises above the reference voltage. In this way, it can be known the instant the battery reaches the threshold value without ever actually determining the SOC or even the output voltage.

In some types of batteries, a battery chills as it is charged, then warms suddenly as the SOC approaches full capacity. In that case, monitoring the temperature of the battery will not give any indication of a fractional value of the SOC, but will indicate when the battery is fully charged. In that case, a charging threshold may be in the form of a temperature threshold, or of a change in temperature.

In some embodiments, the current draw of the high-voltage converter is known or is sufficiently constant that a given battery effectively has a known cycle time during which it can reliably deliver power to the high-voltage converter. In that case, monitoring the passage of time, for example using a countdown timer or other time measurement device, can operate as a SOC sensor. As long as a charged battery is switched into continuity with the high-voltage converter before the previously discharging battery is discharged below a voltage threshold, then uninterrupted operation of the system can be maintained.

It can be seen that in each of these examples, the SOC of a battery is not measured or known, in a narrow sense of the term. Nevertheless, such a configuration would be considered to perform the steps outlined, and thus fall within the scope of the invention.

Where a claim limitation recites a structure as an object of the limitation, that structure itself is not an element of the claim, but is a modifier of the subject. For example, in a limitation that recites "a battery connector configured to be coupled to a battery," the battery is not an element of the claim, but instead serves to define the scope of the term battery connector. Additionally, subsequent limitations or claims that recite or characterize additional elements relative to the battery do not render the battery an element of the claim, unless the battery is positively recited as the subject of a claim limitation.

The abstract of the present disclosure is provided as a brief outline of some of the principles of the invention according to one embodiment, and is not intended as a complete or definitive description of any embodiment thereof, nor should it be relied upon to define terms used in the specification or claims. The abstract does not limit the scope of the claims.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A burner system, comprising:
 a fuel nozzle configured to emit a fuel jet in a combustion process;
 an electrode positioned and configured to apply electrical energy to a combustion reaction supported by the fuel jet;
 a high-voltage converter having an input terminal and an output terminal, the output terminal being coupled to the electrode, the high-voltage converter being configured to receive electrical energy from a low-voltage power supply at the input terminal and to supply a high-voltage potential at the output terminal;
 a battery charger having a charging terminal; and
 a switch module having a first terminal coupled to a first battery connector configured to be coupled to battery terminals of a first battery, a second terminal coupled to the charging terminal of the battery charger, and a third terminal coupled to the input terminal of the high-voltage converter, the switch module being selectively switchable between a first condition, in which the first terminal is coupled to the second terminal and decoupled from the third terminal, and a second condition, in which the first terminal is coupled to the third terminal and decoupled from the second terminal, the switch module being configured such that while switching between the first and second conditions, the first terminal is decoupled from the one of the second and third terminals before being connected to the other of the second and third terminals.

2. The burner system of claim 1, wherein the switch module includes a fourth terminal coupled to a second battery connector configured to be coupled to battery terminals of a second battery, and wherein, when the switch module is in the first condition, the fourth terminal is coupled to the third terminal and decoupled from the second terminal, and when the switch module is in the second condition, the fourth terminal is coupled to the second terminal and decoupled from the third terminal, the switch module being configured such that while switching between the first and second conditions, the fourth terminal is decoupled from the one of the second and third terminals before being connected to the other of the second and third terminals.

3. The burner system of claim 2, comprising a control module configured to control operation of the switch module according to relative amounts of available stored energy in first and second batteries coupled to the first and fourth battery connectors.

4. The burner system of claim 3, wherein the control module is configured to control the switch module to switch from the first condition to the second condition while the amount of available stored energy in the first battery is at least equal to a first threshold and the amount of available stored energy in the second battery is at least equal to a second threshold, lower than the first threshold, and to control the switch module to switch from the second condition to the first condition while the amount of available stored energy in the second battery is at least equal to the first threshold and the amount of available stored energy in the first battery is at least equal to the second threshold.

5. The burner system of claim 4, wherein the control module is configured to control the switch module to switch from the first condition to the second condition at a substantially randomly or pseudo-randomly selected moment after the amount of available stored energy in the first battery has increased to the first threshold and before the amount of available stored energy in the second battery has dropped below the second threshold.

6. The burner system of claim 4, wherein the control module is configured to control the switch module to switch from the first condition to the second condition while the amount of available stored energy in the first battery is in a range between the first threshold and a maximum amount of available stored energy.

7. The burner system of claim 4, wherein the control module is configured to control the switch module to switch from the first condition to the second condition while the amount of available stored energy in the second battery is in a range between the maximum amount of available stored energy and the second threshold.

8. The burner system of claim 4, wherein the control module is configured to control the switch module to switch from the first condition to the second condition at a moment when the amount of available stored energy in the second battery is different from the amounts of available stored energy in the second battery at an immediately prior changing of the switch module from the first condition to the second condition.

9. The burner system of claim 3, wherein the control module is configured to determine the amount of available stored energy in each of the first and second batteries based on a voltage potential across positive and negative battery terminals of the respective battery.

10. The burner system of claim 9, wherein the control module is electrically isolated from the input terminal of the high-voltage converter.

11. The burner system of claim 3, wherein the control module is configured to control operation of the high-voltage converter.

12. The burner system of claim 11, wherein the control module is electrically isolated from the high-voltage converter.

13. The burner system of claim 2 wherein:
the first battery connector includes first and second conductors, the first conductor being configured to be coupled to a positive battery terminal of the first battery and the second conductor being configured to be coupled to a negative battery terminal of the first battery;
while the switch module is in the first condition, the first conductor of the first battery connector is electrically coupled to a first conductor of the second terminal and the second conductor of the first battery connector is electrically coupled to a second conductor of the second terminal; and
while the switch module is in the second condition, the first conductor of the first battery connector is electrically coupled to a first conductor of the third terminal and the second conductor of the first battery connector is electrically coupled to a second conductor of the third terminal.

14. The burner system of claim 2 wherein:
the switch module is configured such that while switching from the first condition to the second condition, the fourth terminal is coupled to the second terminal before the first terminal is decoupled from the second terminal, and while switching from the second condition to the first condition, the first terminal is coupled to the second terminal before the fourth terminal is decoupled from the second terminal.

* * * * *